(12) United States Patent
Spellman

(10) Patent No.: US 6,448,763 B1
(45) Date of Patent: Sep. 10, 2002

(54) SYSTEM FOR MAGNETIZATION TO PRODUCE LINEAR CHANGE IN FIELD ANGLE

(75) Inventor: Charles Albert Spellman, Auburn, IN (US)

(73) Assignee: Siemens Corporation, Frankfort (DE)

( * ) Notice: Subject to any disclaimer, the term of this patent is extended or adjusted under 35 U.S.C. 154(b) by 0 days.

(21) Appl. No.: 09/758,596

(22) Filed: Jan. 10, 2001

(51) Int. Cl.$^7$ ................................................. G01B 7/30
(52) U.S. Cl. ........................ 324/207.21; 324/207.22; 324/207.25
(58) Field of Search ..................... 324/207.2, 207.21, 324/207.25, 207.22; 335/302, 304

(56) References Cited

U.S. PATENT DOCUMENTS

| | | | | |
|---|---|---|---|---|
| 5,321,355 A | * | 6/1994 | Luetzow | 324/207.2 |
| 5,497,081 A | * | 3/1996 | Wolf et al. | 324/207.12 |
| 5,642,042 A | * | 6/1997 | Goossens et al. | 324/173 |
| 5,668,331 A | * | 9/1997 | Schintag et al. | 73/865.9 |
| 5,712,561 A | * | 1/1998 | McCurley et al. | 324/207.2 |
| 5,747,995 A | * | 5/1998 | Spies | 324/207.2 |
| 6,215,299 B1 | * | 4/2001 | Reynolds et al. | 324/207.2 |
| 6,304,704 B1 | * | 10/2001 | Waffenschmidt | 324/202 |
| 6,313,624 B1 | * | 11/2001 | Alhorn et al. | 324/207.17 |
| 6,326,781 B1 | * | 12/2001 | Kunde et al. | 324/207.21 |

* cited by examiner

Primary Examiner—Edward Lefkowitz
Assistant Examiner—Darrell Kinder
(74) Attorney, Agent, or Firm—Mayer, Brown, Rowe & Maw

(57) ABSTRACT

A linear position sensing system with improved accuracy is shown. The sensor system has a magnetic field detector which senses the position of a target object. The target object has a magnet which emits a magnetic field. The position of the target object corresponds to the angle of the detected magnetic field. The linearity of the change in magnetic field angle is roughly proportional to the change in position of the target object. The magnet is magnetized on a slope which is determined by the path of traversal of the target object. In this manner, greater linearity in change of field angle relative to target object travel is achieved by altering the slope of the division between the magnetic poles.

22 Claims, 4 Drawing Sheets

SYSTEM FOR MAGNETIZATION TO PRODUCE LINEAR CHANGE IN FIELD ANGLE

FIELD OF INVENTION

This invention relates to magnet based position sensor. More specifically, this invention relates to a position sensor which uses a magnet which is magnetized such that the angle of the magnetic field varies linearly when rotated or translated.

BACKGROUND

It is desirable in many applications to determine the precise position of various objects which rotate. This is accomplished using magnetically based sensors. Such sensors function by measuring either the change in magnetic field intensity such as by a Hall effect sensor or the change in the angle of the fields such as an anisotropic magnetoresistence (AMR) sensor. A magnet is placed on the axis of a rotating element and rotation angle is sensed by the sensor according to the field angle. Such sensors provide cost effective and accurate measurement of the rotational angle of the object through the measurement of the field intensity or field angle.

Unfortunately, there are numerous applications in which a magnet cannot be placed on the axis of rotation. For example, a sensor for steering wheel position must be mounted on the outer surface of the steering wheel shaft. In such-applications, the magnet is installed on the periphery of the device. However, since the magnet is not on the axis of rotation, the path transcribed by the magnet does not produce an easily quantifiable relationship between input angle and the output field angle. In such applications, some form of field shaping must be employed by the magnetic field sensor in order to modify the field gradient from the magnet such that a relationship may be generated between the rotation and the output voltage of the sensed magnetic field. Such devices also must be used for a magnetic sensor which senses the location of objects which linearly traverse a defined path, since the magnitude of the field changes disproportionally with the distance.

Such present methods suffer from several problems. Most significantly, the magnetic field strength nor the angle of the magnetic field are exactly linear which introduces error in the position measurement. This inaccuracy increases as the magnetic field reach further distances away from the transducers for measurement of the fields.

Additional solutions have included using a linear magneto-resistive transducer in conjunction with a moving magnet. The magnetic field sensed by the transducers is an indication of the position of the magnet. However, the non-linear nature of the magnetic field results in distortions near the ends of the traversal of the magnet. Such distortions may be corrected, but such corrections require extra circuitry or processing which increase the complexity and cost of the device. Additionally, it requires complex shaping of a magnet in order to insure proper magnetic field output over the range of movement of a measured object. Such shaping is difficult to achieve and adds to the cost of the sensor.

Thus, there exists a need for a magnetic sensor which allows placement of a magnet in the target object without reliance on placement on the rotational axis. There is also a further need for a position sensor which uses magnet which can be compensated for a non-axial location on the target object.

SUMMARY OF THE INVENTION

The present invention is embodied in a position sensor system for determining the position of a moveable object. The system has a magnet coupled to the object. A first magnetic field transducer detects the generated magnetic field and outputs a first sinusoidal signal representative of the magnetic field direction. A second magnetic field transducer detects the generated magnetic field and outputs a second sinusoidal signal representative of the magnetic field direction. A signal processor unit is coupled to the first and second magnetic field transducers, the signal processor unit outputs a signal which is a function of the sinusoidal signals representative of the position of the object relative to the first and second transducers. The magnet is magnetized such that the change of the angle of the generated magnetic field detected by the first and second magnetic field transducers is linear to the position of the magnet The invention is also embodied in a method of determining the position of an object. A magnet is fixed on the object. The magnetic field direction produced by the magnets is detected. The magnetic field direction is converted into sinusoidal signals. The position of the object is determined based on the sinusoidal signals. The magnet is magnetized such that the change of the angle of the generated magnetic field detected is linear to the position of the magnet.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
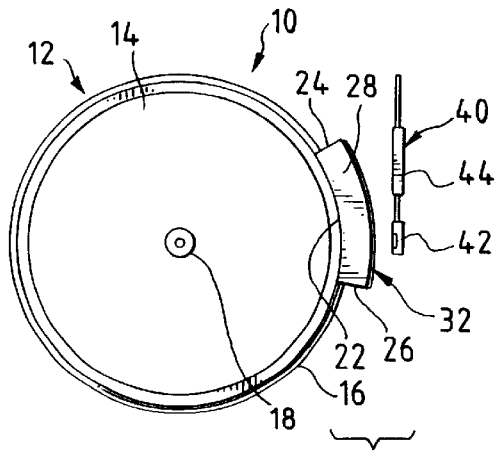
FIG. 1 is a front view of a magnetic field position sensor and a magnet according to one embodiment of the present invention which is mounted on a target object.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 2:
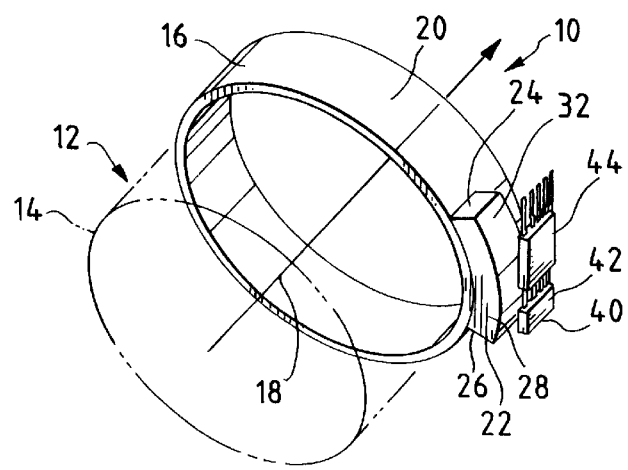
FIG. 2 is a perspective view of the magnet in FIG. 1 located on the target object.
Figure 3:
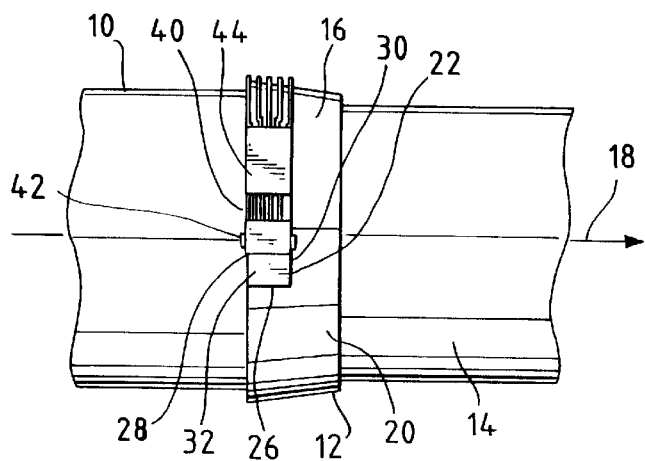
FIG. 3 is a side view of the magnet located FIG. 1 on the target object.

Referring now to the drawings and more particularly to FIGS. 1–3 which shows a front view, perspective view and a side view of a positioning-sensor system generally indicated at 10. In general, the angular positioning sensor system 10 senses the position of a target object 12 such as a rotating flex spline 14 which has a support collar 16 which rotates around an axis 18. The support collar 16 has an outer surface 20 which has a magnet 22 which is arcuately shaped to conform to the outer surface 20.

The magnet 22 has two opposite end surfaces 24 and 26, a pair of opposite side surfaces 28 and 30 and a top surface 32. The top surface 32 of the magnet 22 is arcuately shaped in conformance with the outer surface 20 of the support collar 16. The top surface 32 of the magnet 22 is placed in proximity to a sensor unit 40.

The sensor unit 40 detects the rotational angle of the flex spline 14 via a magnetic transducer unit 42. The output of the magnetic transducer unit 42 is coupled to a signal processing unit 44. The position of the target object 12 is thus detected by the sensor unit 40. The sensor unit 40 is mounted in a non-ferrous package to minimize magnetic interference. In this example, the object is a flex spline 14 but as may be understood, the principles of the sensor 10 and the magnet 22 may be applied to any rotational angle positioning application.

Figure 4:
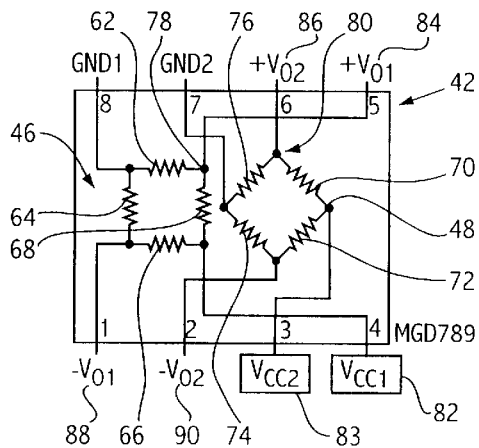
FIG. 4 is a block diagram of the magnetic field sensor detector unit of the sensor of FIG. 1.
Figure 5:
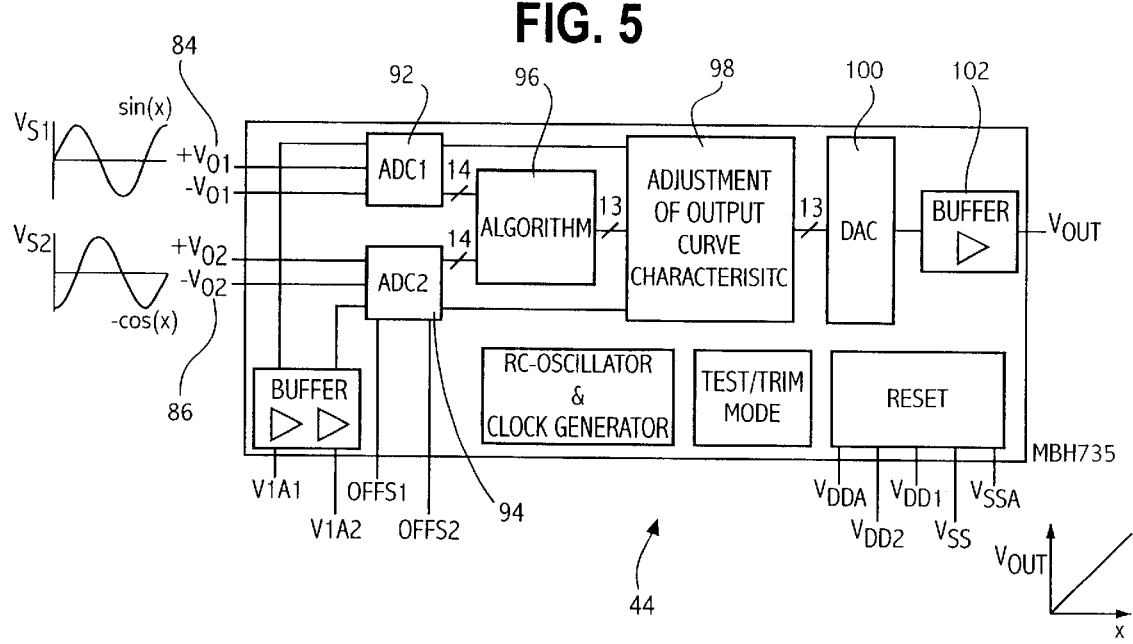
FIG. 5 is a block diagram of the decoding electronics of the sensor of FIG. 1.

FIG. 4 is a block diagram of the magnetic transducer unit 42 and FIG. 5 is a block diagram of the signal processing unit 44. In the preferred embodiment the magnetic transducer unit 42 is a transducer integrated circuit such as a KMZ43 magnetic field sensor manufactured by Philips Electronics. The transducer unit 42 outputs an electronic signal responsive to the detected magnetic field direction from the magnet 22 in FIGS. 1–3. However any appropriate magnetic field sensor may be used. The transducer unit 42 has a pair of magnetic field transducers such as magneto-resistive elements 46 and 48 which detect the direction of the magnetic field generated by magnet 22.

As will be explained below, the transducer unit 42 outputs a pair of varying sinusoidal signals from the magnetic field transducers such as magneto-resistive elements 46 and 48 which are representative of the angle direction of the detected magnetic field from the magnet 22. The outputs of the transducer unit 42 are coupled to the signal processor unit 44. The signal processor unit 44 reads the sinusoidal signals output from the transducer chip 42 and converts them into a digital linear output. The signal processor unit 44 in the preferred embodiment is a UZZ9000 sensor conditioning electronic unit manufactured by Philips Electronics. However any appropriate hardware or software configuration may be used to process the raw signals from the transducer chip 42 to output a linear signal.

With regard to FIG. 4, each sensing element 46 and 48 has a series of four magneto-resistive elements 62, 64, 66 and 68 and 70, 72, 74 and 76 respectively, arranged in two Wheatstone bridge circuits 78 and 80. The magneto-resistive elements 62–76 are preferably thin film Permalloy. The Wheatstone bridge circuits 78 and 80 are separated galvanically.

The Wheatstone bridge circuits 78 and 80 are each coupled to a power source 82 and 83 respectively and ground leads. The Wheatstone bridge circuits 78 and 80 have a positive output 84 and 86 respectively and a negative output 88 and 90 respectively. The four outputs 84, 86, 88 and 90 are coupled to the processing circuit 80. The Wheatstone bridge circuit 78 outputs the sinusoidal signal representing the sine of the magnetic field direction sensed from the magnets 14 and 16. The Wheatstone bridge circuit 80 is oriented at a 45 degree angle to the Wheatstone bridge circuit 78 and thus outputs a sinusoidal signal representing the cosine of the magnetic field direction sensed from the magnet 22.

The Wheatstone bridge circuits 78 and 80 are arranged in order to determine the angle of the magnetic field relative to the circuits 78 and 80. The angle degree of the detected magnetic field is approximately sinusoidally in proportion to the location of the magnet 22 (shown in FIGS. 1–3) in relation to the transducer unit 42. As the magnet 22 moves, the arctangent of the magnetic field angle degree changes in an approximately linear fashion. As will be explained below, the magnetic field in the magnet 22 is shaped such that the angle degree will change linearly despite the fact that the rotation of the magnet 22 does not rotate about its axis.

FIG. 5 is a block diagram of the processing circuit unit 44. The positive output signal 84 of the Wheatstone bridge circuit 78 (shown in FIG. 4) is coupled to an analog to digital converter circuit 92. Similarly, the positive output signal 86 of the Wheatstone bridge circuit 80 is coupled to an analog to digital converter circuit 94. The digital output of the analog to digital converter circuits 92 and 94 are coupled to a circuit processor block 96. The signal processor block 96 converts the signals into a digital signal using a CORDIC algorithm. The CORDIC algorithm converts the sine and cosine values received from the sinusoidal signals into an arctangent value.

The output of the signal processor block 96 is coupled to an output curve characteristic processor 98. The output curve characteristic processor 98 shapes the signal to output the desired span and offset angle. The output of the output curve characteristic processor 98 is coupled to a digital to analog converter 100 which outputs a signal which is buffered by a buffer circuit 102.

As noted above, the signal processor 44 calculates the arctangent of the angle based on the sine and cosine of the magnetic field direction determined from the sensing elements 46 and 48 which measure the magnetic field angle of the magnet 22 and thus the position of the target object 12.

Figure 6:
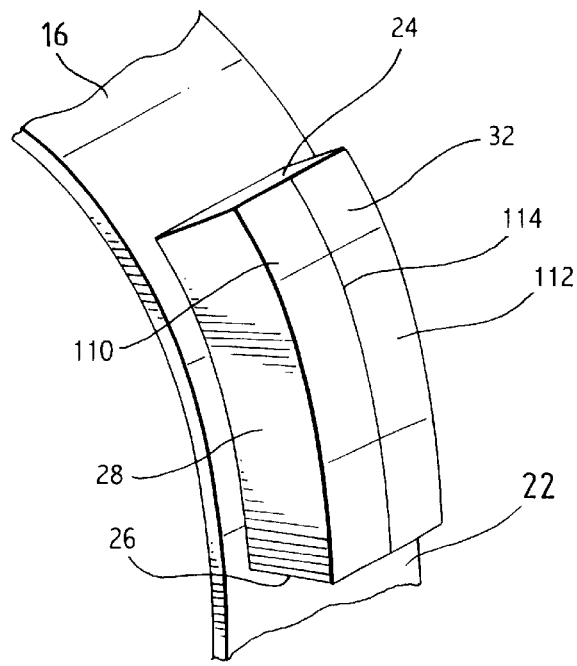
FIG. 6 is a cross sectional view of the magnetization in the magnet located on the target object in FIG. 1.
Figure 7:
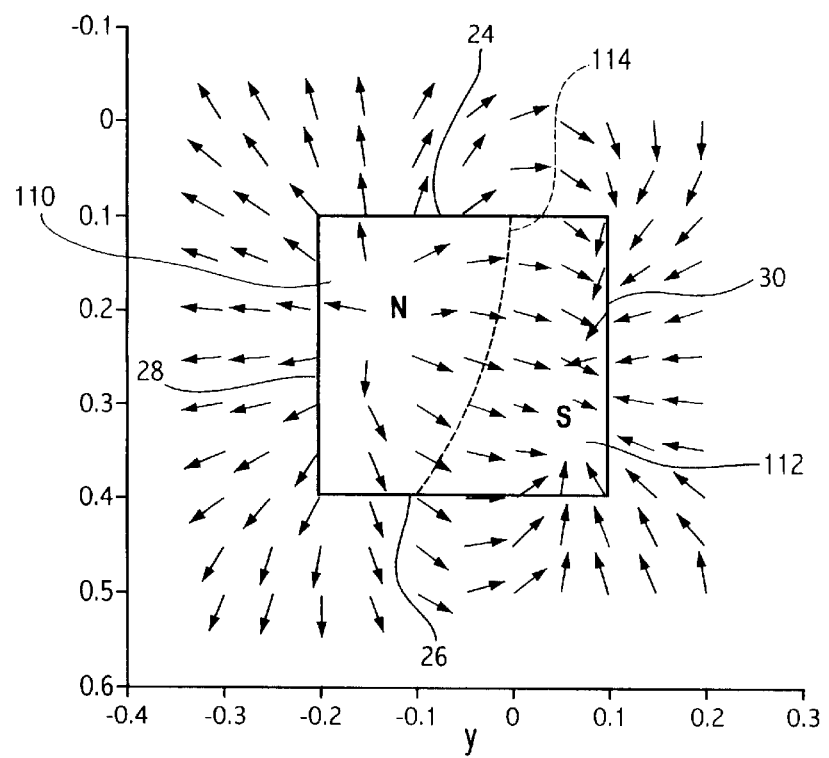
FIG. 7 is a front view of the magnetization in the magnet located on the target object in FIG. 1.

The magnet 22 is typically a rare earth magnet which are preferably made of SmCo material although any suitable magnetic material such as Alnico or ceramic may be used. Alternatively electromagnets may bemused when stronger magnetic fields are desired. FIG. 6 shows a perspective view of the magnet 22 and FIG. 7 shows a cross section view of the magnet 22 showing the magnetization which produces a linear response over a limited rotation of the target object 12. The magnet 22 has a north pole 110 and south pole 112. The north and south poles 110 and 112 are areas created according to a curve equation which will be explained below to produce a linear response over limited rotation of the magnet 22.

The north pole 110 and the south pole 112 are presented on the face 32 of the magnet 22. The end surfaces 24 and 26 are likewise bisected by the north and south poles 110 and 112. The north pole 10 forms the side surface 28 while the south pole 112 forms the side surface 30. As may be seen in FIG. 7, the field directions are angled depending on the position of the magnet. Due to the changing angles of the field depending on the movement of the magnet 22, an approximate linear field measurement is obtained when the magnet 22 is rotated with the support collar 16 relative to the transducer unit 42.

The magnetization is created via shaping the application of high current on the magnetic material of the magnet 22.

Of course other methods may be used to achieve a sufficiently shaped magnetization in the magnet. The magnetization is at a sufficient level to achieve an acceptable signal to noise ratio in the transducer unit 42. A border 114 is shaped as will be explained below to insure that shaped magnetization will occur as the magnet 22 is rotated relative to the transducer unit 42.

The magnet 22 is magnetized with proper co-ordinate transformations to vary the magnetic field angle according to the path followed by the magnet 22 as it is rotated relative to the transducer unit 42. Since the magnet 22 follows an arc, then calculation of γ(θ)=mθ+b will produce a linear angle change with a rotation of θ, where γ is the angle of the normal. θ is the angular position of the magnet 22 relative to the transducer unit 42, m is a constant which is the slope of the line determined by the application and b is an adjustment factor which is used to offset the initial angle measurement. This arrangement provides a linear response since the magnet 22 is not concentric with the axis of rotation 18 of the target object 14 in FIG. 1.

By changing the angle function, γ(θ), a desired linear response may be created for many different inputs or output aside from linear or angular. For example, instead of a linear change in angle, one could require a parabolic change by setting γ(θ)=mx$^2$+b.

Figure 8:
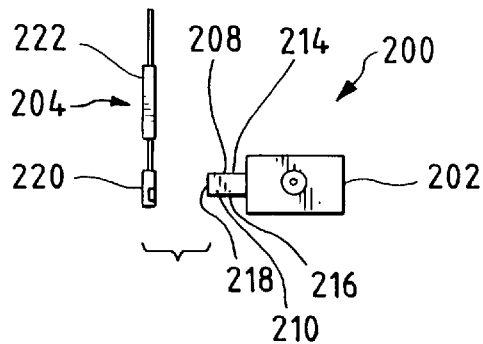
FIG. 8 is a front view of a magnetic field position sensor and magnet located on a target object according to another embodiment of the present invention.
Figure 9:
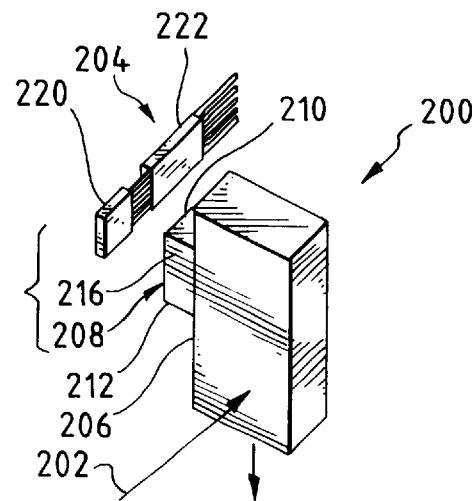
FIG. 9 is a perspective view of the magnet in FIG. 8 located on the target object.
Figure 10:
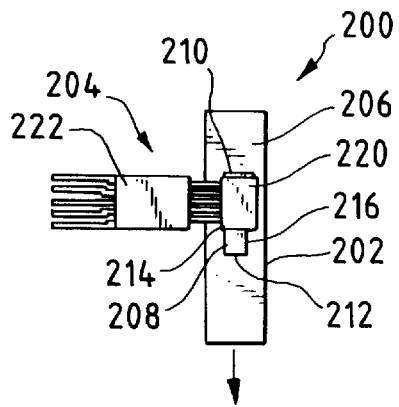
FIG. 10 is a side view of the magnet located FIG. 8 on the target object.

FIGS. 8–10 show a front view, perspective view and a side view of a linear positioning system generally indicated at 200. In general, the linear positioning sensor system 200 senses the position of a target object 202 such as an exhaust gas regulator (EGR) valve stem which moves in a linear motion relative a sensor unit 204. The target object 202 which is sensed by the sensor 204 unit is typically moved or mounted on a fixed track or path to insure strict linear movement.

As in the above embodiment explained in FIGS. 1–3, the linear positioning sensor 204 senses the position of the target object 202. The target object 202 has an outer surface 206 which has a magnet 208 which is shaped to conform to the outer surface 206.

The magnet 208 has two opposite end surfaces 210 and 212, a pair of opposite side surfaces 214 and 216 and a top surface 218. The top surface 218 of the magnet 208 is placed in proximity to the sensor unit 204. The sensor unit 204 and the sensor unit 40 in FIGS. 1–3 and operates in the same manner.

The sensor unit-204 detects the linear position of the target object 202 via a magnetic transducer unit 220. The output of the magnetic transducer unit 220 is coupled to a signal processing unit 222. The position of the target object 202 is thus detected by the sensor unit 204. The sensor unit 204 is mounted in a non-ferrous package to minimize magnetic interference. In this example, the target object 202 is an EGR valve stem but as may be understood, the principles of the sensor 204 and the magnet 218 may be applied to any linear position sensing application.

The magnet 218 is magnetized such that the direction of the magnitude of the magnetic field changes in a prescribed fashion along a path similar to that shown in FIG. 7. The magnet 218 has a north pole 230 and a south pole 232. The magnetization of the magnet 218 is formed along a border 234 in order to insure linear angle output even when the sensor is not exactly linear to the movement of the magnet 218.

In order to insure a linear output, the magnetic field changes along a path for a linearly changing normal along a linear path. This may be described by $$\gamma(x)=mx+b$$

where γ is the angle of the normal. x is the position of the magnet 218 relative to the target object 202, m is a constant which is the slope of the line determined by the application and b is an adjustment factor which is used to offset the initial angle measurement. The normal of the function, s, is ds/dx=−1/(tan(mx+b)). The shape is then determined by:

$$s(x)=-1/m\ \ln(\tan(mx+b))+1/2m\ \ln(1+\tan(mx+b)^2)\ \text{where}\ ds/dx=\gamma(x)$$

The shape may then be used to magnetize the magnet 218 by creating the border region between the north and south poles following the shape described by s(x).

It will be apparent to those skilled in the art that various modifications and variations can be made in the method and system of the present invention without departing from the spirit or scope of the invention. For example, it is to be understood that any linear or rotational sensor system which places a magnet outside of the axis of rotation or movement may utilize the above principles. Examples of rotational applications for vehicles include steering angle sensors, suspension position sensors, window position sensors, throttle plate position sensors and pedal position sensors. Other vehicles such as motorcycles may use the principles described above for applications such as a throttle grip position sensor. The invention is not limited to application to the motor vehicle art. Linear application can include suspension position sensors, seat track position sensors, pedal position sensors, window position sensors and intake and exhaust valve position sensors. Thus, the present invention is not limited by the foregoing descriptions but is intended to cover all modifications and variations that come within the scope of the spirit of the invention and the claims that follow.

What is claimed is:

1. A position sensor system for determining the position of a moveable object, the system comprising:

a magnet coupled to the object, generating a magnetic field;

a first magnetic field transducer which detects the generated magnetic field and outputs a first sinusoidal signal representative of the magnetic field direction;

a second magnetic field transducer which detects the generated magnetic field and outputs a second sinusoidal signal representative of the magnetic field direction, wherein the distance between the first and second magnetic field transducer and the magnet changes when the object is moved;

a signal processor unit coupled to the first and second magnetic field transducers, the signal processor unit outputting a signal which is a function of the sinusoidal signals representative of the position of the object relative to the first and second transducers; and wherein the magnet is magnetized such that the change of the angle of the generated magnetic field detected by the first and second magnetic field transducers is linear to the position of the magnet.

2. The linear position sensor of claim 1 wherein the object moves in a linear motion relative to the first and second transducers.

3. The linear position sensor of claim 1 wherein the object is cylindrical in shape having an outer surface and an axis of rotation and wherein the magnet is located on the outer surface.

4. The linear position sensor of claim 1 wherein the magnet is a rare earth magnet.

5. A position sensor system for determining the position of a moveable object, the system comprising:
   a magnet coupled to the object generating a magnetic field;
   a first magnetic field transducer which detects the generated magnetic field and outputs a first sinusoidal signal representative of the magnetic field direction;
   a second magnetic field transducer which detects the generated magnetic field and outputs a second sinusoidal signal representative of the magnetic field direction;
   a signal processor unit coupled to the first and second magnetic field transducers, the signal processor unit outputting a signal which is a function of the sinusoidal signals representative of the position of the object relative to the first and second transducers;
   wherein the magnet is magnetized such that the change of the angle of the generated magnetic field detected by the first and second magnetic field transducers is linear to the position of the magnet and wherein the object moves in a linear motion relative to the first and second transducers; and
   wherein the magnet is magnetized by dividing the poles according to a change determined by γ(x)=mx+b
      wherein γ is the angle of the normal to the magnet, x is the position of the magnet relative to the object, m is a constant which is the slope of the line and b is an adjustment factor, and wherein the shape, s(x) is determined by:

$$s(x)=-1/m \ \ln(\tan(mx+b))+1/2m \ \ln(1+\tan((mx+b)^2)).$$

6. A position sensor system for determining the position of a moveable object, the system comprising:
   a magnet coupled to the object, generating a magnetic field;
   a first magnetic field transducer which detects the generated magnetic field and outputs a first sinusoidal signal representative of the magnetic field direction;
   a second magnetic field transducer which detects the generated magnetic field and outputs a second sinusoidal signal representative of the magnetic field direction;
   a signal processor unit coupled to the first and second magnetic field transducers, the signal processor unit outputting a signal which is a function of the sinusoidal signals representative of the position of the object relative to the first and second transducers;
   wherein the magnet-is magnetized such that the change of the angle of the generated magnetic field detected by the first and second magnetic field transducers is linear to the position of the magnet and the object is cylindrical in shape having an outer surface and an axis of rotation and the magnet is located on the outer surface; and
   wherein the magnet is magnetized by dividing the poles according to a change determined by γ(*)=mθ+b
      wherein γ is the angle of the normal to the magnet, θ is the angular position of the magnet relative to the first and second magnetic transducers, m is a constant which is the slope of the line, and b is an adjustment factor which is used to offset the initial angle measurement.

7. A method of determining the position of an object, comprising:
   fixing a magnet which generates a magnetic field on the object;
   detecting the magnetic field direction produced by the magnets by a fixed sensor unit wherein the distance between the fixed sensor unit and the magnet changes when the position of the object changes;
   converting the magnetic field direction into sinusoidal signals;
   determining the position based on the sinusoidal signals; and
   magnetizing the magnet such that the change of the angle of the generated magnetic field detected is linear to the position of the magnet.

8. The method of claim 7 wherein the object moves in a linear motion.

9. The method of claim 7 wherein the object is cylindrical in shape having an outer surface and an axis of rotation and wherein the magnet is located on the outer surface.

10. The method of claim 7 wherein the magnet is a rare earth magnet.

11. The method of claim 7 wherein a first and second magnetic field transducers having a Wheatstone bridge with four magnetic transducer elements are used to detect the magnetic field.

12. The method of claim 11 wherein the magnetic transducer elements are magneto-resistive elements.

13. The method of claim 7 wherein the step of detecting the direction of the magnetic field includes measuring the sine of the angle of direction of the magnetic field and measuring the cosine of the angle of the direction of the magnetic field.

14. The method of claim 13 further including the step of calculating the arctangent value of the sinusoidal signals and outputting the arctangent value as a representation of the linear position of the object.

15. The method of claim 7 wherein the step of detecting magnetic field direction is performed using a Hall effect sensor.

16. A method of determining the position of an object moving in a linear motion, comprising:
   fixing a magnet which generates a magnetic field on the object;
   detecting the magnetic field direction produced by the magnets;
   converting the magnetic field direction into sinusoidal signals;
   determining the position based on the sinusoidal signals; and magnetizing the magnet such that the change of the angle of the generated magnetic field detected is linear to the position of the magnet
   wherein the magnet is magnetized by dividing the poles according to a change determined by γ(x)=mx+b
      wherein γ is the angle of the normal to the magnet, x is the position of the magnet relative to the object, m is a constant which is the change of the line and b is an adjustment factor, and wherein the. shape s(x) is determined by:

$$s(x)=-1/m \ \ln(\tan(mx+b))+1/2m \ \ln(1+\tan((mx+b)^2)).$$

17. A method of determining the position of a cylindrical object having an outer surface and an axis of rotation, comprising:
   fixing a magnet which generates a magnetic field on the outer surface of the object;
   detecting the magnetic field direction produced by the magnets;
   converting the magnetic field direction into sinusoidal signals;
   determining the position based on the sinusoidal signals; and magnetizing the magnet such that the change of the angle of the generated magnetic field detected is linear to the position of the magnet; and wherein the magnet is magnetized by dividing the poles according to a change determined by $\gamma(\theta)=m\theta+b$ wherein $\gamma$ is the angle of the normal to the magnet, $\theta$ is the angular position of the magnet relative to the first and second magnetic tansducers, m is a constant which is the slope of the line, and b is an adjustment factor which is used to offset the initial angle measurement.

18. A position sensor system for determining the position of a moveable object, the system comprising:

a magnet which generates a magnetic field coupled to the object;

a magnetic field detector having first and second transducers which detect the generated magnetic field, wherein the distance between the magnetic field detector and the magnet changes when the object is moved;

a signal processor unit coupled to the magnetic field detector and outputting a signal which is a function of the detected magnetic field representative of the position of the object relative to the first and second transducers; and wherein the magnet is magnetized such that the change of the angle of the generated magnetic field detected is linear to the position of the magnet.

19. The position sensor of claim 18 wherein the magnetic field detector includes:

a first magnetic field transducer which detects the generated magnetic field and outputs a first sinusoidal signal representative of the magnetic field direction; and a second magnetic field transducer which detects the generated magnetic field and outputs a second sinusoidal signal representative of the magnetic field direction.

20. The linear position sensor of claim 18 wherein the magnetic field detector is a Hall effect sensor.

21. The linear position sensor of claim 18 wherein the object moves in a linear motion relative to the first and second transducers.

22. The linear position sensor of claim 18 wherein the object is cylindrical in shape having an outer surface and an axis of rotation and wherein the magnet is located on the outer surface.

* * * * *